United States Patent [19]
Sistare

[11] Patent Number: 6,014,514
[45] Date of Patent: Jan. 11, 2000

[54] SYSTEM FOR GENERATING AND GRAPHICALLY DISPLAYING CALL STACK INFORMATION FOR PROCESSING ELEMENTS IN A PARALLEL PROCESSING SYSTEM

[75] Inventor: Steven J. Sistare, Arlington, Mass.

[73] Assignee: Sun Microsystems, Inc., Palo Alto, Calif.

[21] Appl. No.: 08/438,437

[22] Filed: May 15, 1995

[51] Int. Cl.[7] .................................................. G06F 11/32
[52] U.S. Cl. .......................................... 395/704; 395/706
[58] Field of Search .................................. 395/800, 704, 395/706

[56] References Cited

U.S. PATENT DOCUMENTS

| | | | |
|---|---|---|---|
| 4,734,848 | 3/1988 | Yamano | 395/650 |
| 4,972,314 | 11/1990 | Getzinger | 395/476 |
| 5,339,238 | 8/1994 | Benson | 395/700 |
| 5,355,487 | 10/1994 | Keller | 395/704 |
| 5,481,741 | 1/1996 | McKaskle | 395/800 |
| 5,522,022 | 5/1996 | Rao | 395/140 |

*Primary Examiner*—Eric Coleman
*Attorney, Agent, or Firm*—Richard A. Jordan

[57] ABSTRACT

A system for generating a "where graph" for a parallel processing system comprising a parallel processing array controlled by a control processor. The processing array comprises a plurality of processing elements each processing a program comprising a main routine and a plurality of subroutines, the main routine calling at least one subroutine and at least some of said subroutines calling others of said subroutines. The control processor determines a consolidated program routine sequence identifying sequences of routines extending from said main routine to a current routine being processed by said at least some of said processing elements and generates and displays, on, for example, a video display, the program routine sequence in graph form. The graph comprises a plurality of graph nodes, each representing a routine, with the graph nodes being interconnected to depict the consolidated program routine sequence.

18 Claims, 9 Drawing Sheets

SYSTEM FOR GENERATING AND GRAPHICALLY DISPLAYING CALL STACK INFORMATION FOR PROCESSING ELEMENTS IN A PARALLEL PROCESSING SYSTEM

FIELD OF THE INVENTION

The invention relates generally to the field of digital computer systems and more specifically to debugging arrangement for assisting in developing computer programs for use in connection with such computer systems. In particular, the invention provides an arrangement for use in connection with a parallel processing system for generating and graphically displaying call stack information for the processing elements comprising the parallel processing system.

BACKGROUND OF THE INVENTION

In developing computer programs, programmers often use "debugging" tools to enable them to verify correct operation of the programs. Using debugging tools, programmers can step through a program and determine whether the results that the program generates at various points are as would be expected. If the results are correct at one point, and not at a subsequent point, the programmer can expect that the portion of a program between the two points is in error.

Atypical computer program consists of a number of routines, generally including one "main" routine which serves as an entry point when the program is initially booted up. During processing, the main routine generally will call one or a number of other routines, and each of the called routines may call yet other routines. A program may include a number of routines which call each other in a number of levels, something in the form of a tree. The particular series of routines that are called during processing depends upon the particular set of data that are processed. To aid in debugging, program developers often put at various points in the main routine and various other routines instructions that enable the computer to effectively stop processing of the program and report the location in the program at which they stopped. Such a report includes not only the particular routine and source code line number at which the computer stopped, but also the path through the program "tree" taken by the computer in getting to the point at which the computer stopped, which path also includes the identification of the series of routines traversed to the routine in which the stop occurred, as well as the source code line in each routine at which the lower-level routine was called. The result, termed herein a call stack listing, is detailed information as to the path taken by the computer in traversing the tree to the point at which the stop occurred.

In a conventional single-processor ("uni-processor") computer, the call stack listing is relatively easy to interpret. In recently-developed multi-processor systems, most notably in parallel processors which use "multiple-instruction/multiple-data" ("MIMD") or "single-program/multiple-data" ("SPMD") processing methodologies, each processor may be processing generally the same program on separate and distinct data, and so would likely proceed along different paths in the program "tree." In a conventional debugger, a call stack listing would be provided for each of the processors when they encounter the instruction to stop. The collection of call stack listings can be difficult to intepret and use, particularly when the computer includes a number of processors.

SUMMARY OF THE INVENTION

The invention provides a new and improved debugging tool generally for use in connection with a parallel processing system, which enables the generation and graphical display of call stack information for the processing elements comprising the parallel processing system.

In brief summary, the new tool generates a "where graph" for a parallel processing system comprising a parallel processing array controlled by a control processor. The processing array comprises a plurality of processing elements each processing a program comprising a main routine and a plurality of subroutines, the main routine calling at least one subroutine and at least some of said subroutines calling others of said subroutines. The control processor determines a consolidated program routine sequence identifying sequences of routines extending from said main routine to a current routine being processed by said at least some of said processing elements and generates and displays, on, for example, a video display, the program routine sequence in graph form. The graph comprises a plurality of graph nodes, each representing a routine, with the graph nodes being interconnected to depict the consolidated program routine sequence.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
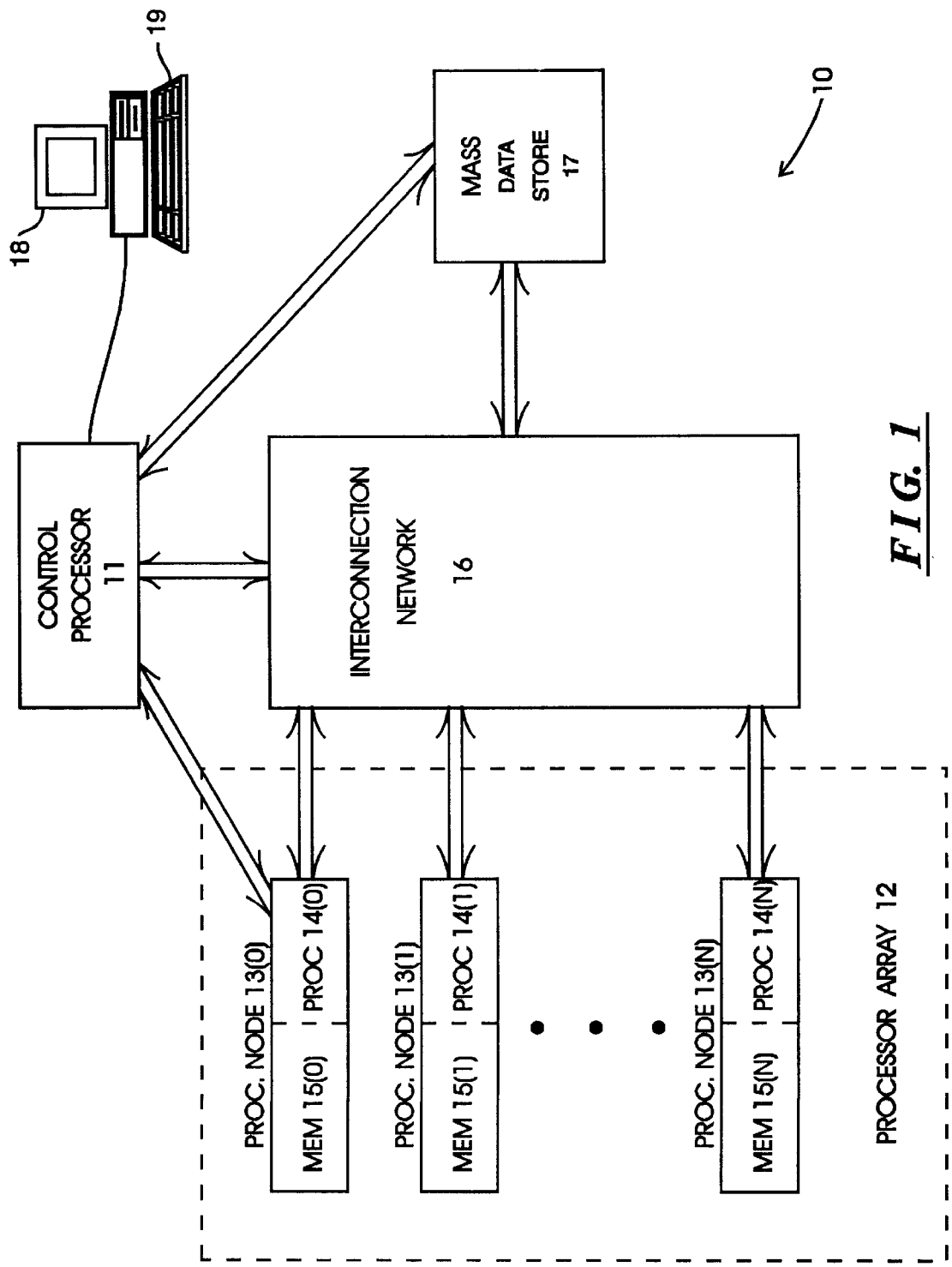
FIG. 1 is a general functional block diagram of a parallel processing system with which the new call stack information generation and display system may be used.

The invention provides a call graph generating and display system (generally identified herein as a "where graph" generating system), which will be described below in connection with FIGS. 2 through 6C, that generates and displays a "where graph", which displays call stack information for various processing nodes in a parallel computer system in a graphical format which is is convenient for a program developer to use and interpret. Initially, it would be helpful to describe generally one embodiment of a parallel computer system with which the "where graph" generating system operates. One such parallel computer system is depicted in FIG. 1. With reference to FIG. 1, parallel computer system 10 in one embodiment includes a control processor 11 which transmits commands to a processor array 12. The processor array 12 includes a plurality of processing nodes 13(0) through 13(N) [generally identified by reference numeral 13(i), "i" being an index from zero to "N"], each including a processor 14(i) and a memory 15(i). The massively-parallel computer depicted in FIG. 1 operates generally in a "MIMD," or "SPMD" manner. When operating in a SPMD manner, the control processor 11 may transmit commands to generally control the processing nodes 13(i). The processors 14(i) receive the commands and, in response, execute one or a series of instructions to process items of data in their respective memories 15(i). (It will be appreciated that the control processor 11 may comprise a separate element, or it may comprise one of the processing nodes 13(i) in the processor array 12.) The processing nodes 13(i) in the processor array 12 may also generate status information during their processing which they provide to the control processor 11. The control processor 11 may, in turn, use the status information in controlling the selection and timing of commands that it sends to the processing nodes 13(i).

The processor array 12 also connects to an interconnection network 16 which enables the processing nodes 13(i) to transfer data thereamong. Each processing node 13(i) is identified by an identifier, which also serves as an address in the interconnection network 16. When one processing node 13(I) needs to send data to another processing node 13(J), it may do so in a message which identifies the recipient processing node 13(J). The interconnection network 16 will receive the mssage from the source processing node 13(I) and transfer it to the destination processing node 13(J). The processing nodes 13(i) may also use the interconnection network 16 to synchronize their operations.

One embodiment of the massively-parallel computer also includes a mass data store 17 which stores data to be processed by the processing nodes 13(i) of the processor array 12 and data that has been processed thereby. In that embodiment, the processor array 12 and mass data store 17 transfer data therebetween through the interconnection network 16. It will be appreciated that a system in accordance with the invention may be implemented in a massively parallel computer which does not include a mass data store 17 connected to network 16 as depicted in FIG. 1, but instead data storage may be performed by some or all of the processing nodes 13(i).

One embodiment of the massively-parallel computer 10 also includes an operator input arrangement (not shown), such as a keyboard and mouse connected to the control processor 11, for enabling an operator to input information to control the computer, and a conventional video display 18 for enabling the computer to display information to the operator.

In one embodiment, the parallel computer system 10 used with the "where graph" generating system includes a computer system such as the systems generally described in U.S. Pat. No. 5,333,268, issued Jul. 26, 1994, in the names of David C. Douglas, et al., entitled Parallel Computer System, and U.S. Pat. No. 5,353,412, issued Oct. 4, 1994, in the names of David C. Douglas, et al, entitled Partition Control Circuit For Separately Controlling Message Sending Of Nodes Of Tree-Shaped Routing Network To Divide The Network Into A Number of Partitions, both assigned to the assignee of the present application.

Figure 2:
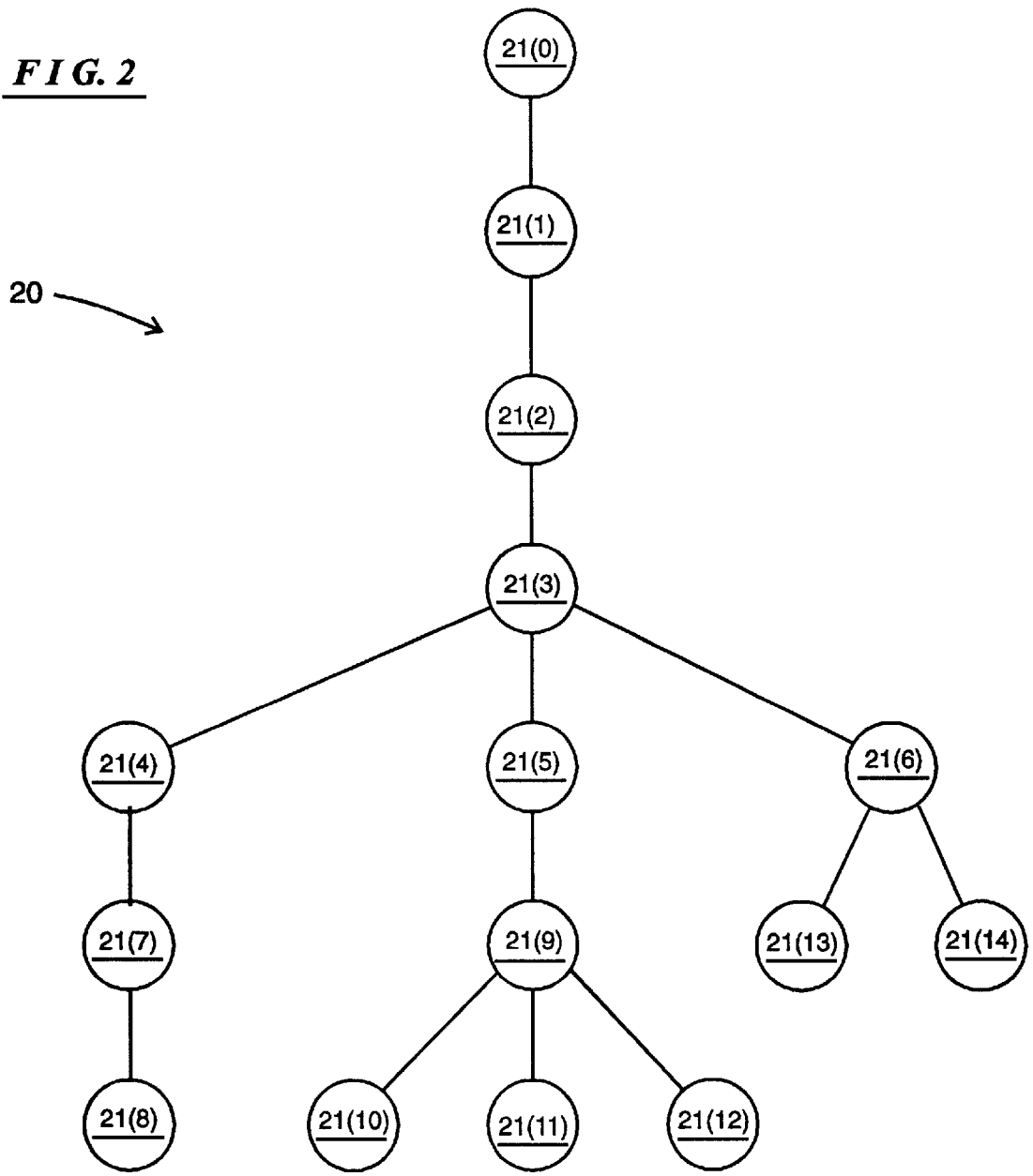
FIG. 2 is an illustrative "where graph" generated by the call stack information generation and display system.

Before proceeding further, it would be helpful to describe a "where graph" generated by the "where graph" generating system described herein. FIG. 2 depicts an illustrative "where graph" generated by the "where graph" generating system. With reference to FIG. 2, "where graph" 20 includes a plurality of nodes 21(0) through 21(J) [generally identified by reference numeral 21(0)] structured in the form of a tree. One node, namely, node 21(0), forms the root of the tree. Each node 21(j) in the tree may have zero, one or several child nodes. The root node 21(0) in the illustrative "where graph" 20 shown in FIG. 2 has one child node 21(1). Nodes 21(j) which have no child nodes are termed "leaf" nodes. In the "where graph" 20, each node 21(j) represents a routine in a program. The root node 21(0) represents the program routine termed herein "main" (which corresponds to the "main" routine in a program written in the well-known C programming language) and each leaf node represents a routine of the program being processed by a processing node 13(i) at a point at which it encounters an instruction enabling it to go into a stopped condition in which it stops processing the program in response to an instruction therefor as described above.

The path of graph nodes from the root node 21(0) to a leaf node 21(j) represents the series of routines from the main program routine to a routine at which at least one stopped processing node 13(i) is in the stopped condition when the "where graph" generating system generates the "where graph". Essentially, each link from one node 21(j) to its child along the path represents a point at which the routine, represented by parent node $21(j_a)$, as a calling routine, enabled the processing node 13(i) to sequence to another routine, represented by the parent's child node $21(j_b)$, as a called routine. All of the processing nodes 13(i) start processing of the program with the "main" program routine, and may also sequence through the same series of initial routines, as represented by a non-branching sequence of nodes 21(0) through 21(3) in FIG. 2, that is, a series of nodes for which each node 21(j) has only one child. At some routine, the processing nodes 13(i) may begin sequencing to different routines. That routine is represented by a node 21(3) which has several children in the "where graph" 20, one child for each of the diverse routines called by the routine represented by the node 21(3). It will be appreciated that a particular routine may call diverse routines at a number of different source code lines; this is represented in "where graph" 20 by the node 21(j) for the calling routine having a separate child node 21(j) for each of the diverse points in the calling routine at which it (the calling routine) calls the called routines. Thus, a particular graph node 21(j) in the "where graph" may have a plurality of child nodes with each child node representing a different line in the calling routine at which the called routines represneted by the child nodes are called. Different child nodes of a particular graph node 21(j) may represent the same called routine if the calling routine represented by the graph node 21(j) calls the same routine at the diverse lines in the calling routine, or they may represent different called routines if the calling routine respresented by the graph node 21(j) calls different routines at the diverse lines in the calling routine.

The "where graph" 20 essentially constitutes a graph representing a composite of information obtained from "call stacks" of the processing nodes 13(i) which are in a stopped condition. By way of background, as is conventional, each processing node 13(i) maintains a "call stack," and, when a calling routine calls a called routine, state information relating to processing of the calling routine is pushed onto the processing node's call stack. The state information includes such information as the identification of the calling routine and the line number of the calling routine at which it called the called routine. The state information for each calling routine forms a "stack frame" on the processing node's call stack. When the final called routine encounters the instruction enabling the processing node to stop processing the program, a portion of the "where graph" generating system processed by the processing node 13(i) assumes control of the processing node, which also enables the final called routine's state information to be pushed onto the processing node's call stack. Accordingly, the series of stack frames for a processing node's call stack identifies the main routine and the series of routines that are called from the main routine to the final called routine, and the "where graph" 20 therefore illustrates the series of such routines for all of the processing nodes in the computer system 10, in a manner that is relatively informative and convenient for a program developer who is developing the program.

In one embodiment, the "where graph" is displayed on video display 18. In that embodiment, each graph node 21(j) can be depicted in several ways, having varying amounts of call stack information. At the lowest level of detail, the graph nodes are in the form of icons which indicate the relationships thereamong thereby to depict the structure of the graph, but which otherwise contain no information. At an intermediate level of detail, the graph nodes are in the form of boxes which identify, for example, the routine of the program associated therewith, a number associated with the link to each child node which identifies the line number of the routine at which the routine associated with the child node was called, and an array that graphically identifies the processing nodes 13(i) that processed the routine represented by the node. At yet a higher level of detail, the graph nodes are also in the form of boxes containing the same information as the graph nodes at the intermediate level of detail, except that a list of the processing nodes 13(i) associated with the routine is provided along with certain state information from the processing nodes' call stacks. In that embodiment, the "where graph" generating system may display different portions of the "where graph" at different levels of detail. If a "current" processing node 13(i) is identified, the "where graph" generating system displays the "where graph" such that the graph nodes associated with routines sequenced through by the "current" processing node will be displayed vertically in a "trunk," and the the other graph nodes in the "where graph" will be arrayed around the trunk.

Figure 3:
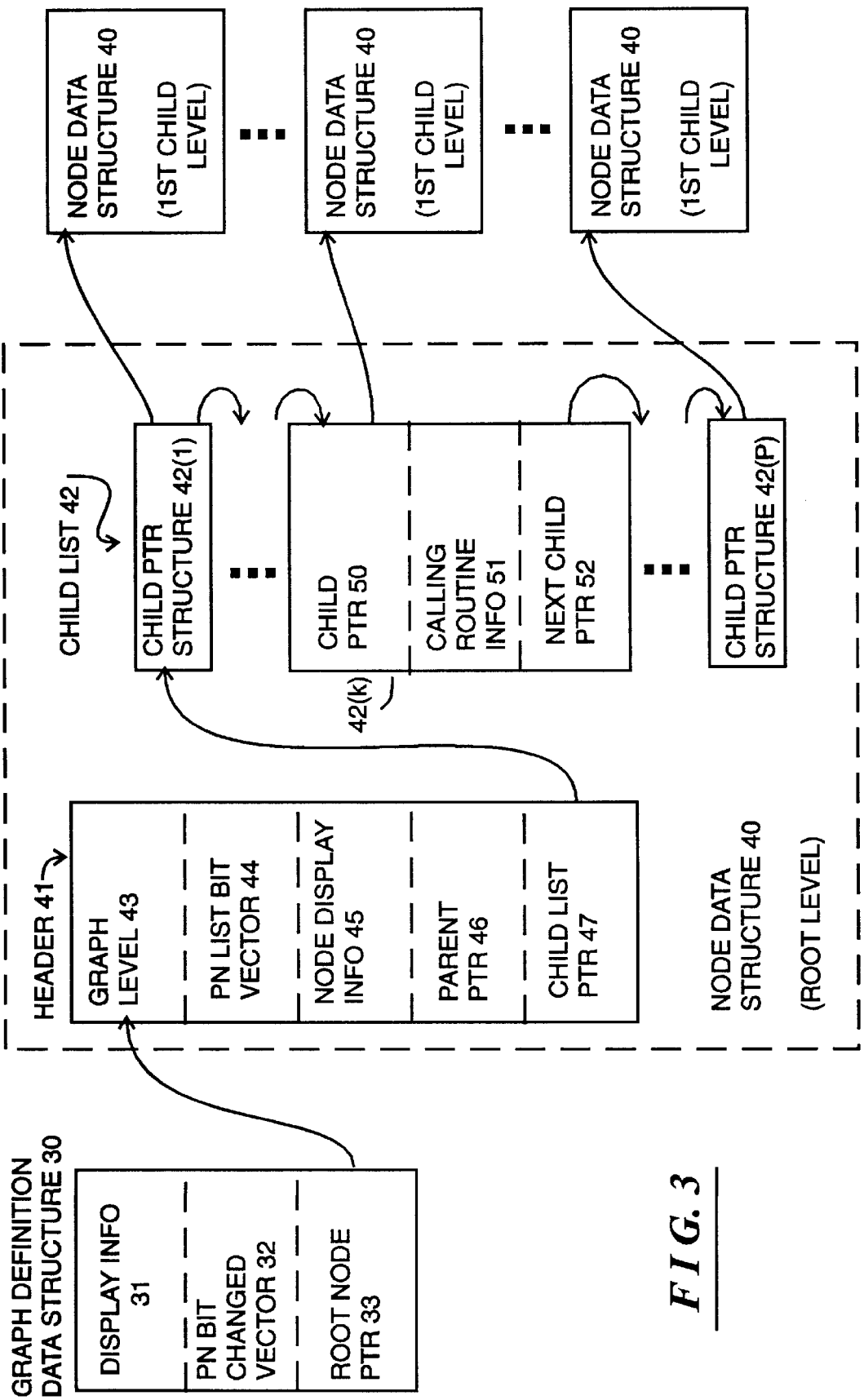
FIG. 3 depicts data structures.

The operations performed by system 10 in generating and displaying a "where graph" will be described in connection with FIGS. 3 through 6C. FIG. 3 depicts a set of data structures which the "where graph" generating system uses to define and display the "where graph" 20, including a graph definition data structure 30, which generally defines the graph, and a set of node data structures 40 each of which includes information one of the graph nodes 21(j) in the "where graph" 20 (an illustrative node data structure 40 for root node 21(0) is shown in detail in FIG. 3). With reference to FIG. 3, the graph definition data structure 30 includes a number of fields, including a display information field 31, a processing node bit changed vector 32 and a root node pointer 33. The root node pointer 33 contains a pointer to the node data structure 40 for the root node 21(0) of the "where graph" 20; as will be described below, the node data structures 40 for the various nodes 21(j) of the "where graph" 20 contain pointers to their respective parent and child nodes to define the tree structure of the "where graph" 20. The graph display information field 31 contains information used by the display in displaying the graph, including such information as which of a number of levels of detail the graph is to be displayed in, which processing node 13(i) is to be a "current" node about which the "where graph" is to be centered in the display, and so forth.

The processing node changed bit vector 32 of the graph definition data structure 30 is used to identify the processing nodes 13(i) whose status have changed since the last time the "where graph" was displayed; this information is enables the "where graph" generating system to initialize a "where graph" before displaying it the first time, and to update a previously generated "where graph" before displaying it in response to a command therefor from an operator. The processing node changed bit vector 32 comprises a bit vector comprising a series of bits CHANGED (i), with each bit being associated with one of the processing nodes 13(i) whose index "i" corresponds to the index "i" of the CHANGED (i) bit of the vector 32. If, when an operator enables the updated display of a "where graph" 20, the state of a processing node 13(i) is changed from the previous time the graph was displayed, its associated bit CHANGED (i) in the processing node changed bit vector 32 is set. Accordingly, if a CHANGED (i) bit associated with a processing node 13(i) is set, its status has changed from either running to stopped, or stopped to running, or both, since the last time the "where graph" was displayed.

The node data structure 40 for each graph node 21(i) of the "where graph" 20 includes a node header structure 41 which includes information describing the node, and a child node list 42 which contains information for and pointers to each of the child nodes. In particular, the node header structure 41 comprises a number of fields, including a graph level field 43, a processing node list bit vector field 44, a node display information field 45, a parent pointer 46 and a child list pointer 47. The graph level field 43 identifies the graph level in the tree for the graph node 21(i) that is associated with the node header structure 41. The root node 21(0) is at the first level; its child node(s) [in the "where graph" 20 depicted in FIG. 2, there is one child node 21(1)] are at the second level, and so forth down the various levels of the "where graph". The processing node list bit vector 44 identifies the processing nodes 13(i) which called the routine associated with the node 21(j) which, in turn, is associated with the node header structure 41. Like the processing node changed bit vector 32 of the graph data structure, the processing node list bit vector 44 includes a series of bits PROC NODE (i) ["i" being an index between zero and "N," the number of processing nodes 13(i)] each associated with a one of the processing nodes 13(i). In the case of the processing node list bit vector, the condition of a PROC NODE (i) bit, whether it is set or clear, that is associated with a processing node 13(i) indicates whether the processing node 13(i) sequenced through or to the routine of the program that is associated with the graph node 21(j). It will be appreciated that, since all of the processing nodes 13(i) execute the "main" routine associated with the root node 21(0), all of the PROC NODE (i) bits of the processing node list bit vector 44 in the node header structure 41 are normally expected to be set. For the root node's child nodes, and other nodes down the "where graph" 20, the PROC NODE (i) bits of the processing node list bit vector 44 which are set will be those PROC NODE (i) bits that are associated with processing nodes 13(i) that processed the routines in sequencing from the main routine to the routines represented by the respective nodes.

The node header structure's node display information field 45 provides such information as the position of the size and position of the associated node 21(j) on the display, whether the node is in the form of an icon, and the like. The parent pointer 46 points to the node header structure 40 of the node's parent in the where graph 20. Since the root node 21(0) has no parent, the parent pointer 46 of the node header structure 41 for the root node's node data structure 40 will not point to another node 21(j) in the "where graph" 20, but may instead point to the graph definition data structure 30.

The node header structure's child list pointer 47 points to the child node list 42, in particular to a series of child pointer structures 42(1), . . . 42(P) [generally identified by reference numeral 42(k)] which are connected together to form a linked list. Each child pointer structure 42(k) includes a number of fields, including a child pointer 50, a calling routine information field 51 and a next child pointer 52. The child pointer 50 points to the node data structure 40 for one of the node's child nodes 21(j), and thereby defines the link between the node and the child node. The calling routine ifnormation field 51 contains information such as the line number of the calling routine at which it called the called routine associated with the child pointer structure's child node. The next child pointer 52 points to the child data structure 42(k+1) of another child node associated with the node data structure 40. Since, as noted above, the child node list 42 is in the form of a linked list, the child list pointer 47 of the node header structure 41 points to the first child pointer structure 42(1) in the child node list 42, and the next child pointer 52 of each child pointer structure 42(K) ("k" being an index between 1 and "P") points to a next child pointer structure 42(K+1) in the node data structure. The child list pointer 47 of the last child pointer structure 42(P) in the node data structure contains a null value to indicate that it is the last child pointer structure 42(P).

Figure 4:
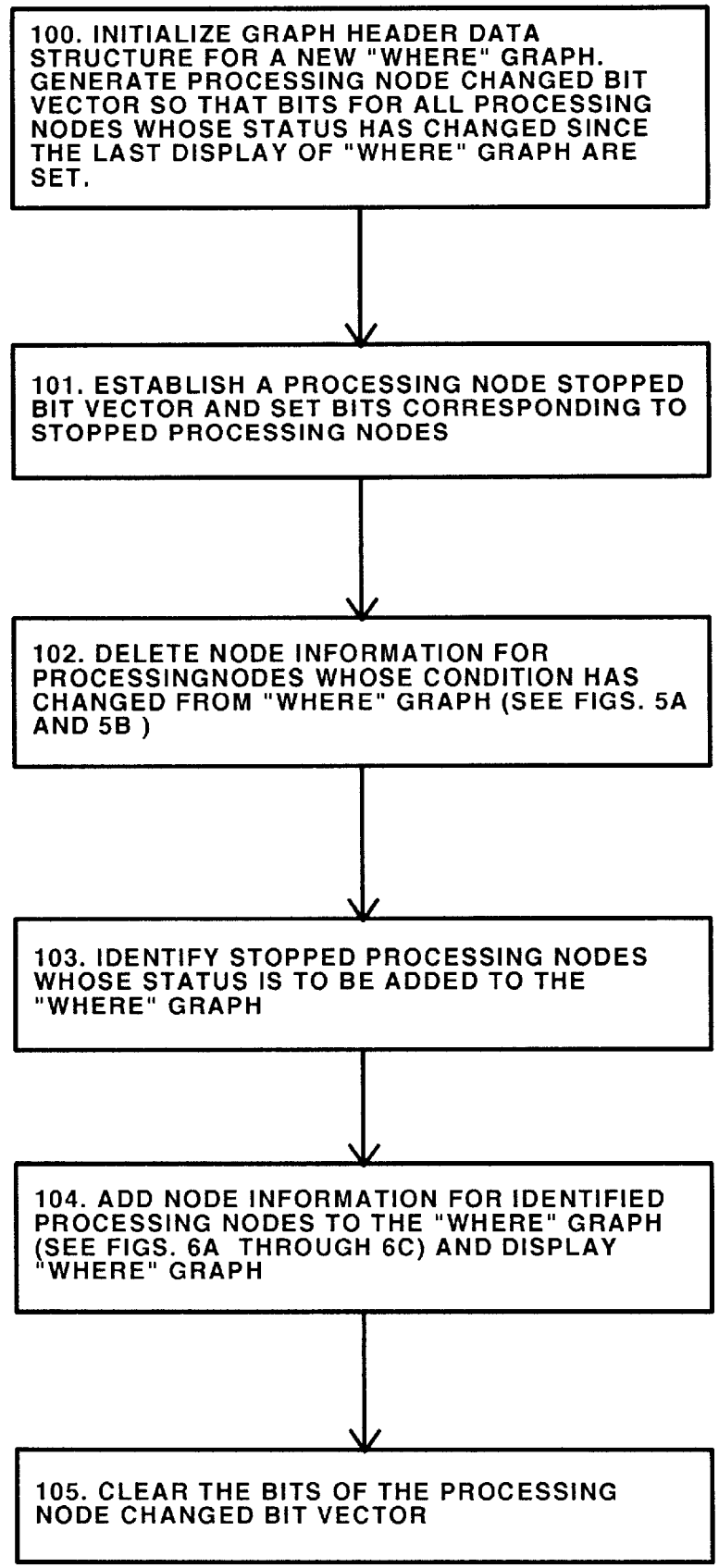
FIGS. 4, 5A, 5B, 6A, 6B and 6C depict flow diagrams, all of which are useful in understanding the operation of the new call stack information generation and display system.

With this background, the operations performed by the "where graph" generating system in generating or updating a "where graph" will be described in connection with the flow diagrams depicted in FIGS. 4 through 6C. FIG. 4 depicts the general operations performed by the "where graph" generating system in generating and updating a "where graph" in response to a command therefor from an operator during a debugging session. The operator may enable the "where graph" generating system to generate a "where" by issuing a command, in one of a number of ways, to the system. In one embodiment, the "where graph" generating system forms part of a debugger system, and the operator will issue such a command by, for example, selecting the an item associated with the "where graph" generating system from a menu provided by the debugger system. It will be appreiciated that other command issuing arrnagements may also be used to enable the "where graph" generating system, including textual commands entered by the operator from a keyboard in connection with convenitonal command line systems.

In any case, with reference to FIG. 4, when the "where graph" generating system is enabled by an operator to display a "where graph", the "where graph" generating system first initializes or updates a "where graph" definition data structure 30 (step 100). It will be appreciated that, if "where graph" generating system is generating an initial "where graph" for a debugging session, or if explicitly requested by the operator, the "where graph" generating system will normally initialize the "where graph" definition data structure 30, but if the operator is merely enabling the "where graph" generating system to update a previously-existing "where graph", the "where graph" generating system may instead update the "where graph" definition data structure. In initializing the "where graph" definition data structure 30, the "where graph" generating system will load a null value into various ones of the fields 31 and 33. In addition, the "where graph" generating system will set all of the bits of the processing node changed bit vector 32, which will enable the "where graph" generating system to generate an initial "where graph" in respect of status from all of the various processing nodes 13(i). On the other hand, if the "where graph" generating system is merely updating the "where graph" definition data structure 30 in step 100, it will merely set the bits of the processing node changed bit vector 32 associated with processing nodes 13(i) whose conditions have changed, that is, which have gone from a running condition to a stopped condition or from a stopped condition to a running condition, since the last time the "where graph" was displayed, which, as will be clear from below, will enable the "where graph" generating system to update the "where graph" in connection with only the processing nodes 13(i) whose condition has changed.

Thereafter, the "where graph" generating system establishes a processing node "stopped" bit vector (not shown) which, like the processing node changed bit vector 32, has a plurality of bits STOPPED (i) ("i" being an index from zero through N) each associated with a processing node 13(i) (step 101). The "where graph" generating system then sets the bits STOPPED (i) of the processing node stopped bit vector which are associated with the ones of the processing nodes 13(i) which are stopped (step 101). Accordingly, at this point, the CHANGED (i) bits of the processing node changed bit vector 32 identify the processing nodes 13(i) whose conditions have changed (that is, either changed from a stopped condition to a running condition, or changed from a running condition to a stopped condition) since the last time the operator issued a command to display the "where graph", and the STOPPED (i) bits of the processing node stopped bit vector identify the processing nodes 13(i) which are in a stopped condition when the operator issues a command to display the "where graph".

Following step 101, the "where graph" generating system uses the processing node changed bit vector 32 to delete from the nodes 21(j) of the "where graph" all information for any processing nodes 13(i) whose condition has changed (step 102, described in more detail below in connection with FIGS. 5A and 5B). Thereafter, the "where" garph generating system uses the processing node changed bit vector 32 and the processing node stopped bit vector to identify the ones of the stopped processing nodes 13(i) whose status is to be added to the "where graph" (step 103). It will be appreciated that, since (a) for the processing node changed bit vector 32, each CHANGED (i) bit indicates the whether the status of the processing node 13(i) with the corresponding index "i" has changed since the last time the operator issued the "where graph" display command, and (b) for the processing node stopped bit vector, each STOPPED (i) bit indicates whether the processing node 13(i) is in the stopped condition, the conjunction (logical "AND") of the CHANGED (i) bit and the STOPPED (i) bit for each index "i" indicates whether the processing node 13(i) having the same index "i" went into the stopped condition since the last time the "where graph" was displayed. For those processing nodes 13(i) for which the STOPPED (i) bit is set, indicating that the correspondingly-indexed processing nodes 13(i) are in the stopped condition, but the CHANGED (i) bit is clear, indicating that the correspondingly-indexed processing nodes 13(i) have not changed state since the last time the "where graph" was displayed, the processing nodes' information is already in the "where graph" and need not be updated. On the other hand, for those processing nodes 13(i) for which the STOPPED (i) bit is set, indicating that the correspondingly-indexed processing nodes 13(i) are in the stopped condition, but the CHANGED (i) bit is set, indicating that the correspondingly-indexed processing nodes 13(i) have changed state since the last time the "where graph" was displayed, the processing nodes' information must be inserted in the "where graph". In step 103, the "where graph" generating system generates a "new" bit vector (also not shown) comprising a plurality of bits NEW (i), each associated with a correspondingly-indexed processing node 13(i), with the set or clear condition of each bit NEW (i) being determined by the conjunction (that is, the logical AND) of the correspondingly-indexed STOPPED (i) and CHANGED (i) bit. Accordingly, the "where graph" generating system will add the status information for the processing nodes 13(i) whose NEW (i) bits are set to the "where graph" (step 104). Thereafter, the "where graph" generating system will clear the bits of the processing node changed bit vector (step 105) and display the "where graph".

It will be appreciated that, since the "where graph" generating system, in step 102 deletes processing node information from the "where graph" for processing nodes 13(i) whose CHANGED (i) bits are set, indicating a change in status, and then in step 104 adds the processing node information for processing nodes 13(i) whose CHANGED (i) and STOPPED (i) bits are both set, it (a) deletes processing node information for all of the processing nodes 13(i) which are no longer in a stopped condition, and (b) obtains processing node information for the processing nodes 13(i) whose status has changed to the stopped condition, the "where graph" generating system will display in the "where graph" the processing node information only for the processing nodes 13(i) which are currently stopped when the operator issues the "where graph" enabling command.

As noted above, in step 102 the "where graph" generating system deletes from the nodes 21(j) of the "where graph" the processing node information for the processing nodes 13(i) whose condition has changed, using the bits CHANGED (i) of the processing node changed bit vector 32. The "where graph" generating system will perform that operation in a series of iterations, during successive iterations deleting the processing ndoe information for succcessive ones of the processing nodes 13(i) with set CHANGED (i) bits. The detailed operations performed by the "where graph" generating system in connection with these operations are depicted in FIGS. 5A and 5B.

Figure 5A:
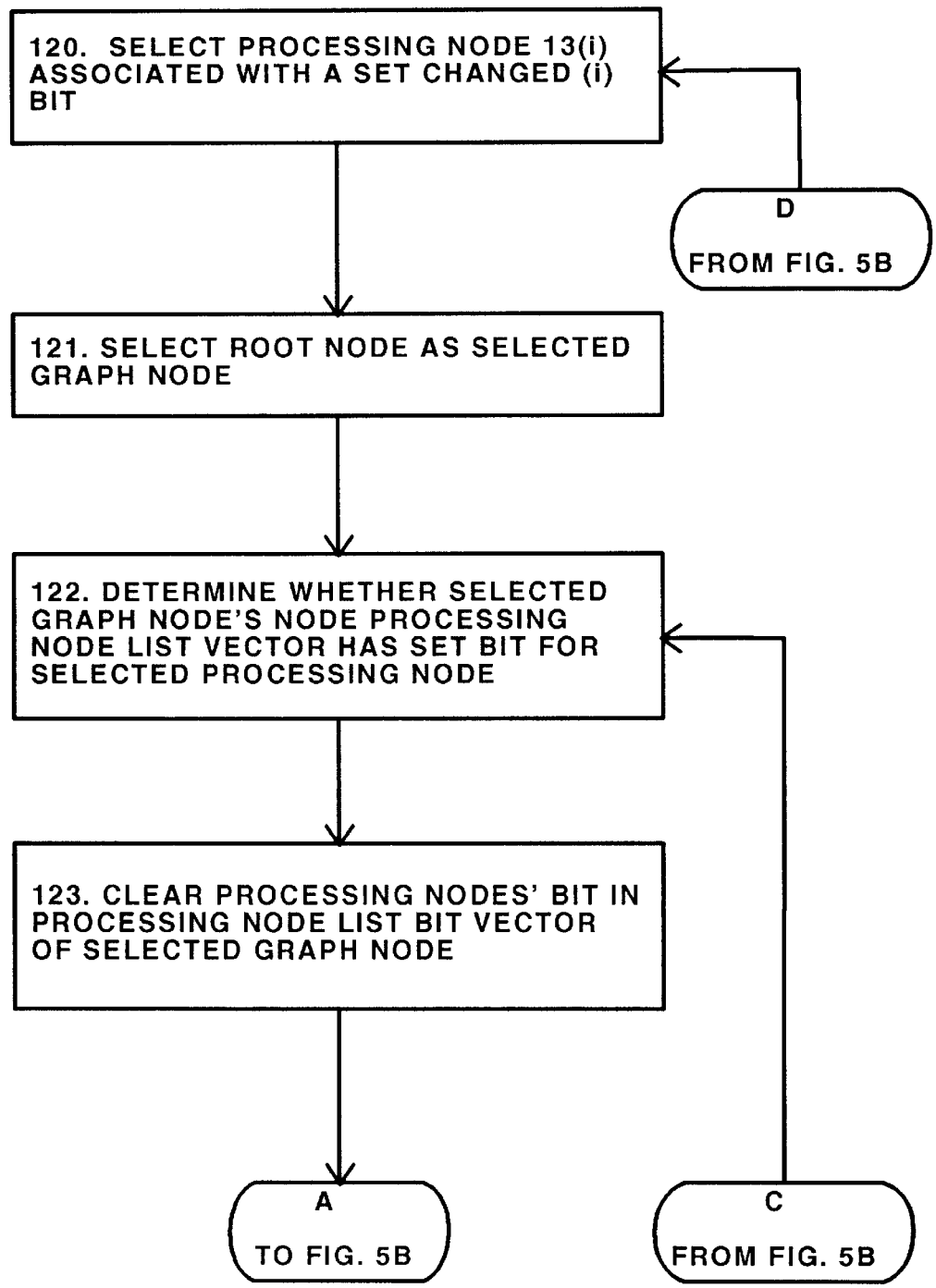

With reference to FIG. 5A, the "where graph" generating system initially selects a processing node 13(i) whose associated CHANGED (i) bit of the processing node changed bit vector 32 is set (step 120). In one embodiment, the system will normally initially identify the first set CHANGED (i) bit in the processing node changed bit vector, that is, the CHANGED (i) bit having the lowest value for index "i." The "where graph" generating system will then select the root node 21(0) of the "where graph" (step 121) and will determine whether the bit of the processing node list bit vector 44 associated with the selected processing node 13(i) in the root node's node data structure 40 is set (step 122). It will be appreciated that, if a processing node's bit of the processing node list bit vector 44 is not set in the node data structure 40 for one node 21(j) in the "where graph" 20, it will not be set in the node data structures for any of that node's child nodes or other descendants in the graph. Accordingly, if a processing node's bit of the processing node list bit vector 44 is not set in the node data structure for the root node, the previously-established "where graph" does not include any processing node information, and so the "where graph" generating system returns to step 120 to select the next processing node which is associated with a set CHANGED (i) bit.

If, on the other hand, the "where graph" generating system determines in step 122 that the bit of the processing node list bit vector 44 associated with the selected processing node 13(i) in the root node's node data structure 40 is set, it clears the bit (step 123) and determines whether all of the bits of the processing node list bit vector are clear (step 124). If at least one of the bits of a processing node node list bit vector 44 in a graph node's node data structure 40 is set, at least one processing node 13(i) sequenced through or to the routine associated with that graph node 21(j) before stopping processing of the program. In that case, if the root node has at least one child node, the "where graph" generating system proceeds to determine whether the bit associated with the processing node is set in the processing node list bit vector 44 of the node data structure 40 for one of the child nodes (step 125). If the processing node's bit is not set in any child node, the selected processing node 13(i) was stopped while processing the main routine. Accordingly, the "where graph" generating system would at that point be finished with operations in connection with the processing node 13(i), and so it will return to step 120 to select another processing node 13(i') for processing.

On the other hand, if the "where graph" generating system determines in step 125 that, in the node data structure 40 for one of the root node's child nodes, the bit of the processing node list bit vector 44 associated with the select processing node 13(i) is set, it establishes that child node as the "selected" node and returns to step 122. At that point, the "where graph" generating system will repeat the operations described above in connection with that child node.

The "where graph" generating system will repeat the operations through a series of iterations at successively-lower levels in the "where graph" until it determines either (a) in step 124, that all bits of the selected graph node's processing node list bit vector are clear, or (b) in step 125 that no child of the selected graph node has node data structure 40 in which the selected processing node's bit in the processing node list bit vector 44 is set. If the "where graph" generating system determines, in step 125 during an iteration, that no child of the selected graph node has node data structure 40 in which the selected processing node's bit in the processing node list bit vector 44 is set, it will return to step 120 to select the next processing node 13(i) associated with a CHANGED (i) bit which is set, and repeat the operations in connection with that processing node 13(i). On the other hand, if the "where graph" generating system determines, in step 124, that all bits of the selected graph node's processing node list bit vector are clear, then the status of all processing nodes 13(i) which the "where graph" previously indicated had passed through or to the routine associated with the graph node had changed. As a result, the "where graph" generating system will sequence to a series of steps 127 and 128 to remove the selected graph node and all nodes of the "where graph" descending therefrom, and in addition will remove the child node pointer 42(k) thereto from the node data structure 40 for the parent node. Thereafter, the "where graph" generating system will return to step 120 to select the next processing node 13(i') associated with a CHANGED (i) bit which is set.

The "where graph" generating system will repeat these operations for each of the processing nodes 13(i) whose CHANGED (i) bits of the processing node changed bit vector 32 of the graph definition data structure 30 are set. After it has performed the operations in connection with all of these processing nodes 13(i), the "where graph" generating system will have removed all processing node information for processing nodes 13(i) whose status has changed from the "where graph" (step 102).

As noted above, the "where graph" generating system, after deleting the processing node information for the processing nodes 13(i) whose status has changed from the nodes 21(j) of the "where graph" 20, it will then will add to the "where graph" the status information for the processing nodes 13(i) whose NEW (i) bits are set, indicating that the correspondingly-indexed processing nodes 13(i) are in the stopped condition and that they have changed state to the stopped condition since the last time the "where graph" was displayed (step 104). The detailed operations performed by the "where graph" generating system in step 104 will be described in connection with FIGS. 6A and 6B.

Figure 6A:
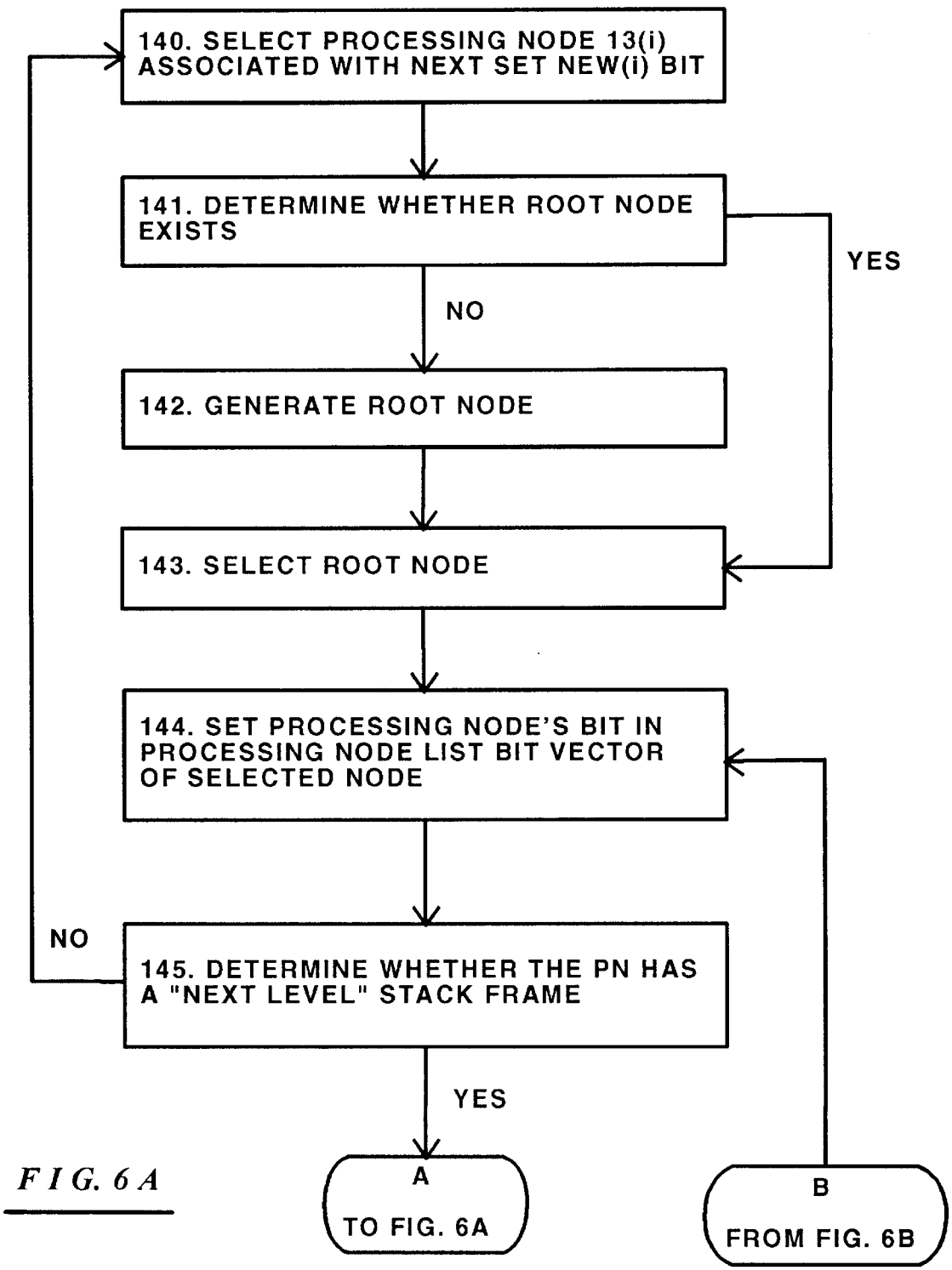
Figure 6B:
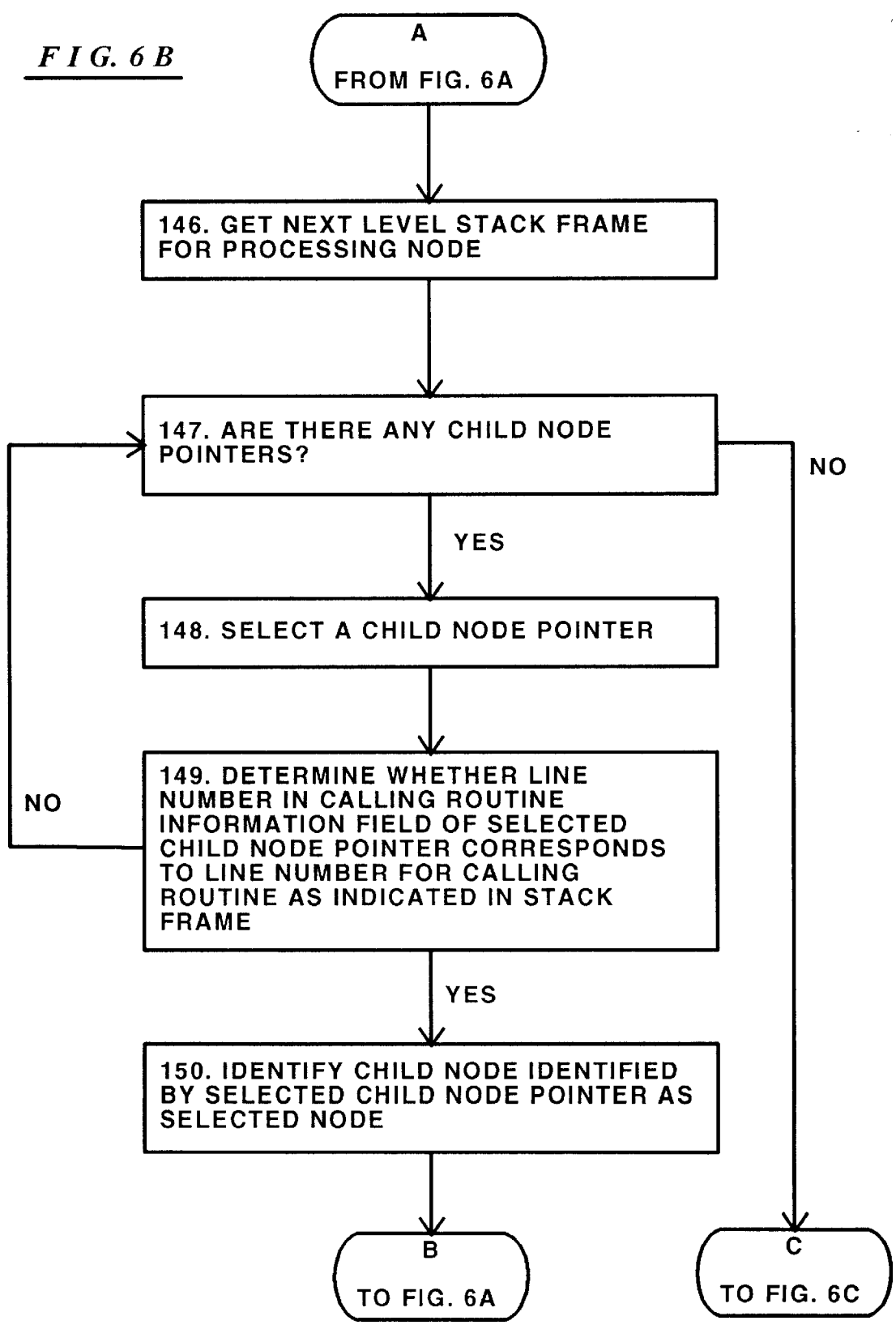
Figure 6C:
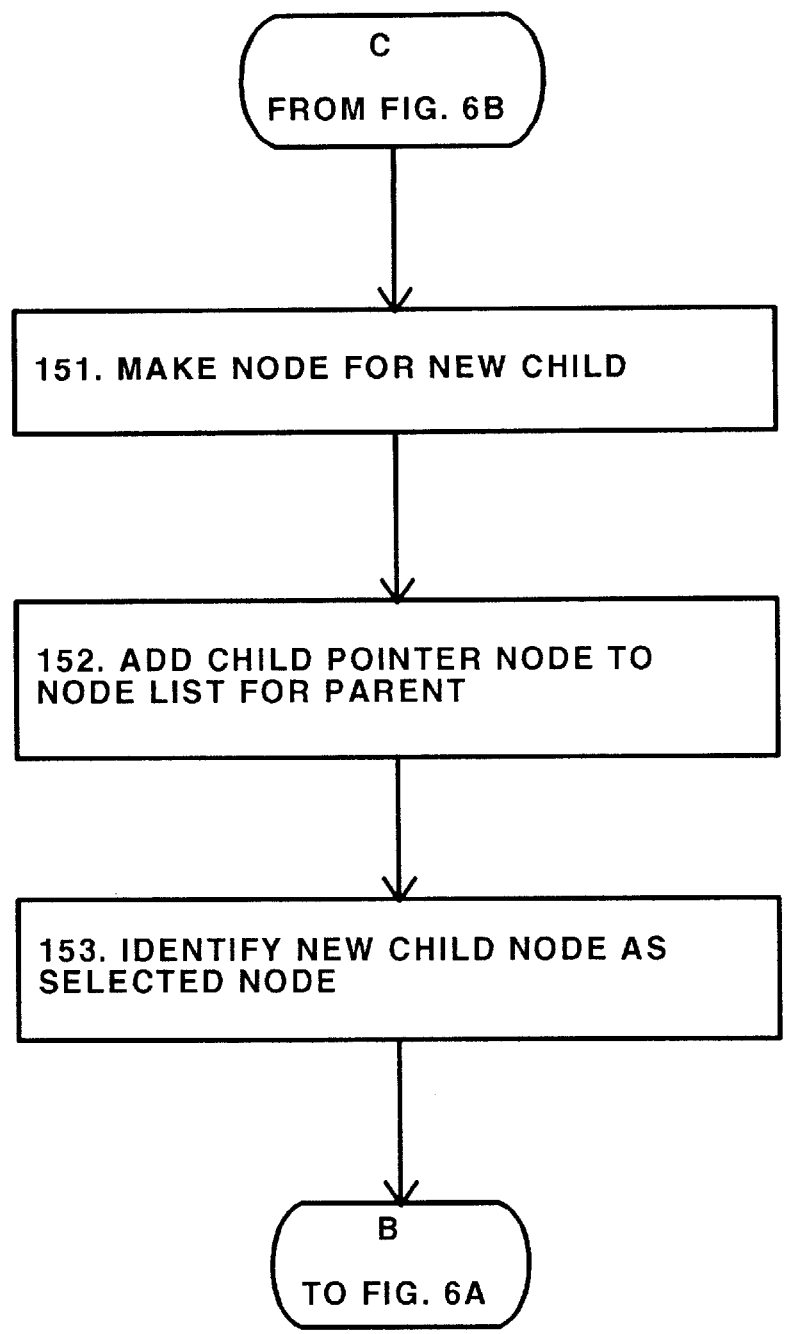

With reference to FIG. 6A, the "where graph" generating system initially identifies a processing node 13(i) whose correspondingly-indexed NEW (i) bit is set, indicating that its status has changed, with the change being to a stopped condition (step 140). In one embodiment, the system will normally initially identify the first set NEW (i) bit in the "new" bit vector, that is, the NEW (i) bit having the lowest value for index "i." Thereafter, the "where graph" generating system will determine whether the root node 21(0) of the "where graph" exists (step 141), thereby to determine whether the "where graph" in fact exists. In that operation, the "where graph" generating system will detrmine whether the root node pointer 33 of the graph definition data structure 30 contains a null value, which would indicate that the root node 21(0) does not exist, or a value other than a null value, which would comprise a pointer to a node data structure for a root node 21(0). If the root node does not exist, the "where graph" generating system generates and initializes the node data structure 40, in particular the node header structure 41, and loads a pointer thereto into the root node pointer 33 of the graph definition data structure 30 (step 142).

Following step 141, the "where graph" generating system "selects" the root node 21(0) (step 143), and sets the processing node's bit PROC NODE (i) in the processing node list bit vector 44 (step 144). This serves to indicate that the associated processing node 13(i) sequenced through or to the routine of the program, namely the "main" routine, that is associated with the root node 21(0). Thereafter, the "where graph" generating system determines whether there is a "next level" stack frame, that is, a stack frame on the call stack for another routine (step 145). If there is a "next level" stack frame, the main program processed by the processing node 13(i) will have called at least one other "called" routine, which will be reflected in the processing node 13(i) being identified in at least one lower-level node 21(j) in the "where graph". On the other hand, if the "where graph" genrating system determines that the call stack for the processing node 13(i) has no "next level" stack frame, the processing node 13(i) will have stopped in the "main" routine, and it will not be identified in any lower-level node 21(j) in the "where graph". In that case, the "where graph" generating system returns to step 140 to begin processing in connection with the processing node 13(i') associated with the next PROC NODE (i) bit in the processing node list bit vector 44 which is set.

Figure 5B:
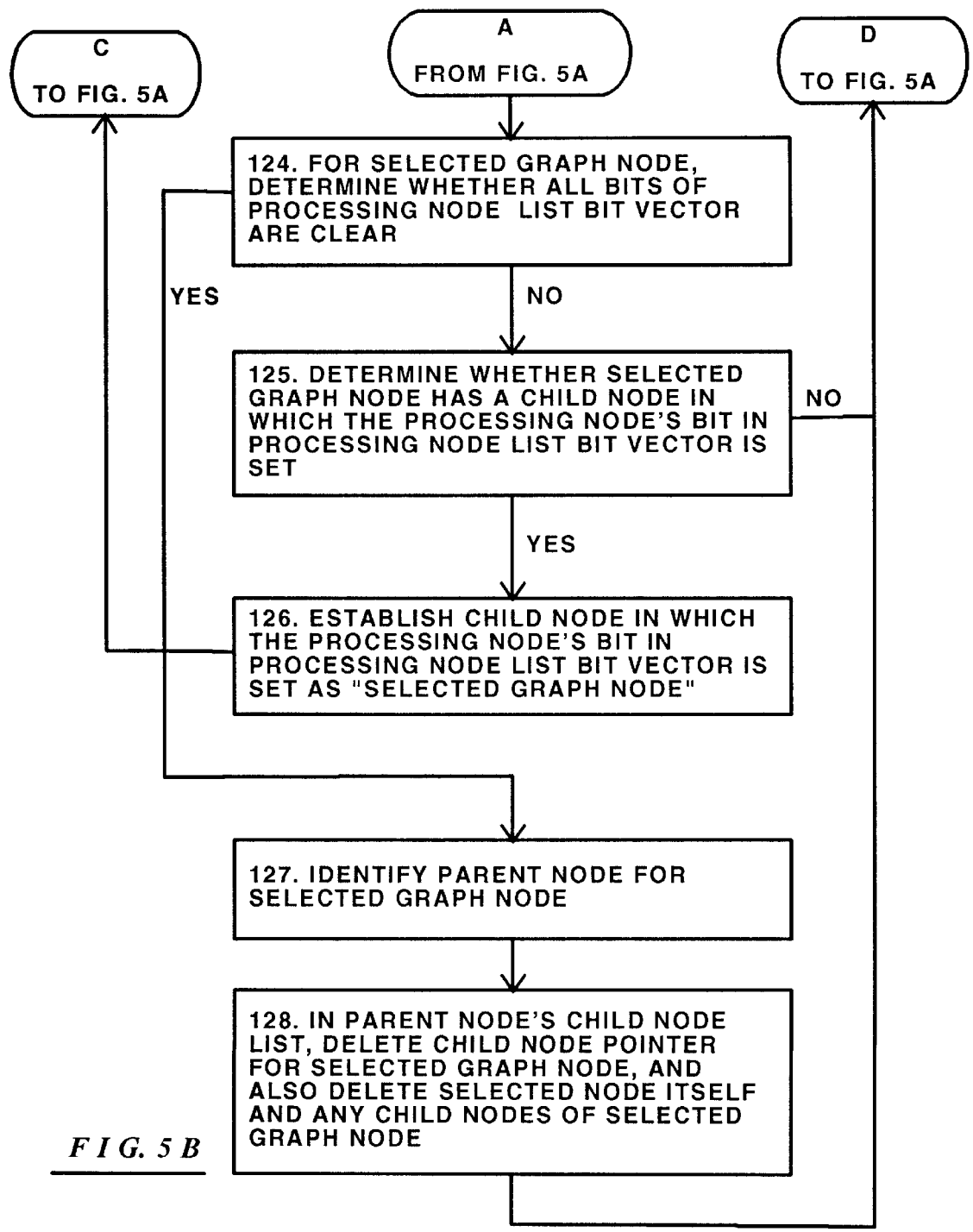

As noted above, if the "where graph" generating system determines in step 145 that the processing node 13(i) has a "next level" stack frame, indicating that the "main" routine of the program called at least one other routine, it sequences to step 146 (FIG. 5B). In that step, the "where graph" generating system gets the next level stack frame for the processing node 13(i). The next level stack frame retrieved in step 146 is the stack frame for the routine that was called by the calling routine, which at this point is the main routine. The "where graph" generating system then determines, from the child list pointer field 47 of the node header stcuture 41, whether the node data structure 40 for the calling routine has any child node pointers 42(k) (step 147), thereby to enable the "where graph" generating system to determine whether the node 21(j) has any childs. If the "where graph" generating system determines in step 147 that the node data structure 40 for the calling routine has a child node, it proceeds to a series of steps 148–150 to step through the successive child node pointers 42(k) to determine if one exists for the called routine, and if so to add the processing node information for the processing node 13(i) to the node data structure 40 for that child node. On the other hand, if the "where graph" generating system determines that the node has no child nodes, or if it determines during processing of steps 148–150 that no child node exists in the "where graph" 20 for the called routine, it will proceed to a series of steps 151–153 (FIG. 5C) to add a child node pointer 41 and a node data structure 40, thereby to create a child node for the called routine.

More specifically, in response to a positive determination in step 147, indicating that the node data strcuture 40 for the main routine includes at least one chile node pointer 42(k), the "where graph" genarating system selects a child node pointer (step 148). At this point, the "where graph" geenerating system will use the child list pointer 47 of the node header structure 41 of the node data structure 40 for the root node to identify the first child node pointer 42(1), which it will use as the selected node. The "where graph" generating system will compare the relevant information from the calling routine information field 45 of the child node pointer 42(1), in particular, the line number at which the calling routine called the called routine associated with the child node pointed to by the child node pointer 42(1), to the corresponding information from the stack frame for the calling routine (step 149). If they match, the calling routine called the called routine at the line of the calling routine that is identified by the contents of the child node pointer's calling routine information field 45. It will be appreciated by those skilled in the art that the particular line of a calling routine at which a called routine is called uniquely identifies the called routine that is called by the calling routine, so that, while the line number does not identify the called routine by name, it does serve to inferentially identify the called routine.

If the "where graph" generating system determines in step 149 that the line number identified in the calling routine informaition field 45 of the first called node pointer 42(1) of the node data structure 40 does not correspond to the line number of the stack frame for the main routine, it will return to step 147 and determine whether there is a subsequent child node pointer 42(2) in the child node list 42 for the node data structure 40 of the root node 21(0). For this operation, the "where graph" generating system will test the next child pointer field 46 of the first child pointer node 42(1). If the field 46 contains a null value the first child pointer node 42(1) will be the only child pointer node, and the root node 21(0) will have only one child node. On the other hand, if the field 46 contains a value other than a null value, the value contained in the field 46 will be a pointer to a second child pointer node 42(2), and the root node 21(0) will have at least one additional child node. As above, if the "where graph" generating system determines in step 147 that there is a subsequent child node pointer 42(2), it will select that child node pointer (step 148) and determine whether the line number in the calling routine information field 45 of that child node pointer 42(2) corresponds to the line number of the calling routine at which the called routine was called. If not, it will return to step 147, and the sequence of operations described in connection with steps 147 thorugh 149 will be repeated.

It will be appreciated that the "where graph" generating system will repeat the series of steps 147 through 149 through a series of iterations until it determines (a) in step 147 that the child node list 42 does not have any further child node pointers 42(k), or (b) in step 149 that the calling routine information field 45 of the child node pointer selected during the iteration identifies the same calling routine line number as the stack frame. If the "where graph" generating system determines in step 149 that the calling routine information field 45 of the child node pointer selected during the iteration identifies the same calling routine line number as the stack frame, the processing node 13(i), when in the main routine, called the routine associated with the child node pointed to by that child node pointer, and so it will identify that child node as a selected node, and return to step 144 to perform the operations described above in connection with that node.

On the other hand, if the "where graph" generating system determines in step 147, during the first iteration in connection with the root node 21(0), that the root nodes' node data structure 40 does not have any child node pointers 42(k), or during a subsequent iteration that the root node's node data structure has a child node pointer 42(k) but none whose calling routine information field 45 identifies a line number corresponding to the line number in the stack frame of the processing node 13(i) at which the main routine called the called routine, it sequences to a series of steps 151 through 153 (FIG. 5C) to add a child node for the called routine. With reference to FIG. 5C, in those operations, the "where graph" generating system initially establishes and initializes a node data structure 40 for the new child node 21(j), in particular a node header structure 41 (step 151). In that operation, the "where graph" generating system will load a value in the "where graph" level field 43 idenifying the node 21(j) as being in the second level of the "where graph", since the node 21(j) is a child of the root node 21(0). In addition, the "where graph" generating system will establish a processing node list bit vector 44, provide node display information for field 45, a parent node pointer pointing to the node data structure 40 for the parent node (in this case, the root node) for field 46, and will load a null value into the child list pointer 47 indicating that the new node does not itself have any child nodes. It will be appreciated that, at this point the "where graph" generating system need not set the PROC BIT (i) of the processing node list bit vector 44 which is associated with the selected processing node 13(i); that bit will be set in step 144, as will be explained below.

After creating the new node data structure 40 for the child node in step 152, the "where graph" generating system will identify the new child node as the "selected" node (step 153). Following step 153, or following step 150 if the "where graph" generating system determined in steps 147 through 149 that an existing child node was associated with the routine called by the processing node 13(i) and that no additional child node needed to be created, it will return to step 144 to repeat the operations described above in connection with that node. As noted above, in step 144, the "where graph" generating system will set the PROC BIT (i) of the processing node list bit vector 44 of the selected child node's node data structure 40 which is associated with the selected processing node 13(i). Following step 144, the "where graph" generating system will determine whether the processing node's call stack includes yet another stack frame for another called routine, and if so, retreieves the stack frame and performs either (a) steps 147 through 150 to select an existing child node if one was previously created for the called routine, or (b) steps 150 through 153 to create a new child node for the called routine.

The "where graph" generating system will repeat these operations through a series of iterations for each successive stack frame, in each iteration either using an existing child node or creating a new one as described above. It will be appreciated that, at some point, the "where graph" generating system will determine in step 145 that there is no "next level" stack frame. At that point, the "where graph" generating system has established a complete branch of the "where graph" for the processing node 13(i), and it will return to step 140 to select the next processing node 13(i) whose associated NEW (i) bit is set, which, as noted above, indicates that it is in the stopped condition and that it has changed its condition from the previous time the "where graph" was called, and perform the operations depicted in FIGS. 5A through 5C in connection with that processing node. The "where graph" generating system will repeat these operations for each of the processing nodes whose NEW (i) bit is set. After performing the operations for each processing node, the "where graph" will include all of the processing node information for all of the processing nodes which are in the stopped condition.

While the "where graph" generating system has been described in connection with a parallel computer system 10 in which the control processor 11 is separate from the processor array 12, it will be appreciated that the "where graph" generating system may be advantageously used in connection with a parallel computer system 10 in which a processing node 13(i) of the processor array 12 performs the operations described above as being performed by the control processor 11. In addition, the "where graph" generating system may be advantageously used in connection with a parallel computer system operating in a MIMD manner, in which each processing node 13(i) processes its own separate instruction stream, generally not under control of commands from a control processor; in that case, one of the processing nodes will perform the operations described above as being performed by the control processor 11 to enable the "where graph" to be generated.

It will further be appreciated that the "where graph" generating system described above provides a number of advantages. In particular, in a debugging session during development of a computer program, the "where graph" generating system provides a graphical display of the identifications of the main routine and the series of routines that are called from the main routine to the final called routine for each of the plurality of processing nodes in a parallel computer system, in a graphical manner that is relatively informative and convenient for a program developer who is developing a program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the united states is:

1. A processing condition graph generating system for use in connection with a parallel processing system a parallel processing array, said parallel processing array comprising a plurality of processing elements, each processing a program comprising a plurality of routines including a main routine and a plurality of subroutines, said main routine calling at least one subroutine and at least some of said subroutines calling at least one other of said subroutines, the processing condition display system comprising:

A. a status condition determination element for generating, in response to procedure call information retrieved from at least some of said processing elements of said parallel processing array, consolidated program routine sequence information identifying sequences of routines extending from said main routine to a current routine being processed by said at least some of said processing elements; and B. a condition graph generating element for generating a graph representing the consolidated program routine sequence information generated by said status condition determination element, said graph comprising a plurality of graph nodes, each graph node representing a routine, the graph nodes being interconnected to depict the consolidated program routine sequence information.

2. A processing condition graph generating system as defined in claim 1, the processing condition display system operating under control of an operator, the operator providing an operational enable input, the status condition determination element generating the consolidated program routine sequence information in response to the operational enable input.

3. A processing condition graph generating system as defined in claim 2 in which the graph generated by the condition graph generating element is displayed to the operator.

4. A processing condition graph generating system as defined in claim 2 in which the status condition determination element comprises:
   A. a changed condition detection element for determining, in response to said operational enable input from said operator, whether the processing status of each said processing node has changed since a previous operational enable input from said operator;
   B. a consolidated program routine sequence update element for updating the consolidated program routine sequence information for each processing node whose processing status has changed.

5. A processing condition graph generating system as defined in claim 4, the main routine and subroutines comprising a computer program, the processing condition graph generating system being used in connection with a debugger to facilitate debugging of the computer program, the computer program including "stop" program instructions to enable the processing nodes to, when they execute a respective one of said "stop" program instructions, enter a stopped condition in which they stop processing the computer program at the point at which the "stop" program instruction, the status condition determination element generating said consolidated program routine sequence information for the ones of said processing nodes which are in the stopped condition.

6. A processing condition graph generating system as defined in claim 1, each processing node including a call stack defining program routine sequence information for the processing node, the status condition determination element retrieving the program routine sequence information from said processing nodes and using it to generate the consolidated program routine sequence information.

7. A processing condition graph generating method for use in connection with a parallel processing system a parallel processing array, said parallel processing array comprising a plurality of processing elements, each processing a program comprising a plurality of routines including a main routine and a plurality of subroutines, said main routine calling at least one subroutine and at least some of said subroutines calling at least one other of said subroutines, the processing condition display method comprising the steps of:
   A. generating, in response to procedure call information retrieved from at least some of said processing elements of said parallel processing array, consolidated program routine sequence information identifying sequences of routines extending from said main routine to a current routine being processed by said at least some of said processing elements; and
   B. generating a graph representing the consolidated program routine sequence information, said graph comprising a plurality of graph nodes, each graph node representing a routine, the graph nodes being interconnected to depict the consolidated program routine sequence information.

8. A processing condition graph generating method as defined in claim 7, the processing condition display method being performed under control of an operator, the operator providing an operational enable input, the status condition determination step being performed to generate the consolidated program routine sequence information in response to the operational enable input.

9. A processing condition graph generating method as defined in claim 8 further including the step of displaying the graph generated during the condition graph generating step to the operator.

10. A processing condition graph generating method as defined in claim 8 in which the status condition determination step includes the steps of:
   A. determining, in response to said operational enable input from said operator, whether the processing status of each said processing node has changed since a previous operational enable input from said operator;
   B. updating the consolidated program routine sequence information for each processing node whose processing status has changed.

11. A processing condition graph generating method as defined in claim 10, the main routine and subroutines comprising a computer program, the processing condition graph generating method being used in connection with a debugger to facilitate debugging of the computer program, the computer program including "stop" program instructions to enable the processing nodes to, when they execute a respective one of said "stop" program instructions, enter a stopped condition in which they stop processing the computer program at the point at which the "stop" program instruction, the consolidated program routine sequence information being generated for the ones of said processing nodes which are in the stopped condition.

12. A processing condition graph generating method as defined in claim 7, each processing node including a call stack defining program routine sequence information for the processing node, the status condition determination step including the steps of retrieving the program routine sequence information from said processing nodes and using the retrieved program routine sequence information to generate the consolidated program routine sequence information.

13. A processing condition display computer program product for use in connection with a computer, the computer in turn being used in connection with a parallel processing system a parallel processing array, said parallel processing array comprising a plurality of processing elements, each processing a program comprising a plurality of routines including a main routine and a plurality of subroutines, said main routine calling at least one subroutine and at least some of said subroutines calling at least one other of said subroutines, the processing condition display computer program product comprising a computer-readable medium having thereon:
   A. a status condition determination module for enabling the computer to generate, in response to procedure call information retrieved from at least some of said processing elements of said parallel processing array, consolidated program routine sequence information identifying sequences of routines extending from said main routine to a current routine being processed by said at least some of said processing elements; and B. a condition graph generating module for enabling the computer to generate a graph representing the consolidated program routine sequence information generated during processing in response to said status condition determining module, said graph comprising a plurality of graph nodes, each graph node representing a routine, the graph nodes being interconnected to depict the consolidated program routine sequence information.

14. A processing condition graph generating computer program product as defined in claim 13, the processing condition display computer program product enabling the computer to operate under control of an operator, the operator providing an operational enable input, the status condition determination module enabling the computer to generate the consolidated program routine sequence information in response to the operational enable input.

15. A processing condition graph generating computer program product as defined in claim 14 in which the graph generated under control of the condition graph generating module is displayed to the operator.

16. A processing condition graph generating computer program product as defined in claim 14 in which the status condition determination module comprises:

A. a changed condition detection module for enabling the computer to determine, in response to said operational enable input from said operator, whether the processing status of each said processing node has changed since a previous operational enable input from said operator;

B. a consolidated program routine sequence update module for enabling the computer to update the consolidated program routine sequence information for each processing node whose processing status has changed.

17. A processing condition graph generating computer program product as defined in claim 16, the main routine and subroutines comprising a computer program, the processing condition graph generating computer program product being used in connection with a debugger to facilitate debugging of the computer program, the computer program including "stop" program instructions to enable the processing nodes to, when they execute a respective one of said "stop" program instructions, enter a stopped condition in which they stop processing the computer program at the point at which the "stop" program instruction, the status condition determination module enabling the computer to generate said consolidated program routine sequence information for the ones of said processing nodes which are in the stopped condition.

18. A processing condition graph generating computer program product as defined in claim 13, each processing node including a call stack defining program routine sequence information for the processing node, the status condition determination module enabling the computer to retrieve the program routine sequence information from said processing nodes and use it to generate the consolidated program routine sequence information.

* * * * *